T. EMTMAN.
SWIVEL PAN JOINT.
APPLICATION FILED FEB. 15, 1911.

1,031,777.

Patented July 9, 1912.

Witnesses:
J. D. Thornburgh.
Lutie D. Atter.

Inventor:
Theodore Emtman.
by Townsend Hauxhurst
attys.

COLUMBIA PLANOGRAPH CO., WASHINGTON, D. C.

UNITED STATES PATENT OFFICE.

THEODORE EMTMAN, OF LOS ANGELES, CALIFORNIA.

SWIVEL PAN-JOINT.

1,031,777.  Specification of Letters Patent.  Patented July 9, 1912.

Application filed February 15, 1911. Serial No. 608,824.

*To all whom it may concern:*

Be it known that I, THEODORE EMTMAN, a citizen of the United States, residing at Los Angeles, in the county of Los Angeles and State of California, have invented a new and useful Swivel Pan-Joint, of which the following is a specification.

This invention relates to a swivel pan joint which is especially adapted for use as a swivel joint in the pipe used for conducting concrete from a tower to the point where it is to be delivered. In a swivel joint used for this purpose, the concrete is often compelled to make a very sharp turn in passing from the upper section of pipe to the lower section and it is essential that the passage of concrete through the joint should not be restricted but should be permitted to flow freely through the joint even when adjusted into the most extreme positions, and one of the main objects of the present invention is to so construct the joint that the concrete may pass with perfect freedom therethrough with the pipe adjusted at any working angle.

Another important object of the invention is to permit the lower pipe to be swiveled in a horizontal plane with respect to the upper pipe and to also be capable of adjustment in a vertical plane, thereby securing the advantages of a universal joint.

A further important object of the invention is to provide for supporting each member of the joint, so that the bearing surfaces of the swivel are not required to carry the weight of the pipe and its contents, which would be considerable and would restrict the free adjustment of the swivel joint.

Another object is to so construct the joint that the two members while coöperating with each other and forming a continuous conduit do not have a close contact with each other. This gives room for manual access to the interior of the joint to remove any obstructions which might cause clogging at the joint.

Other objects and advantages will be brought out in the following specification.

Figure 1:
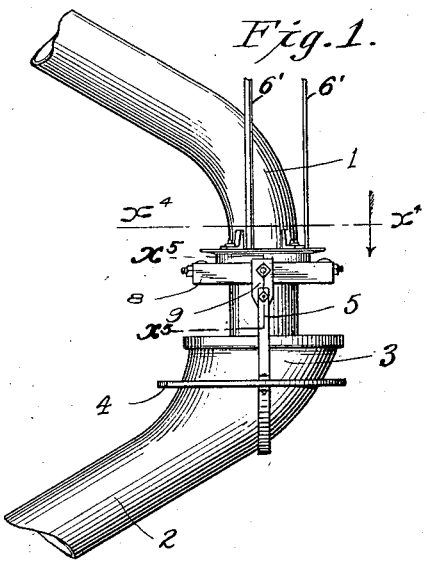
Figure 4:
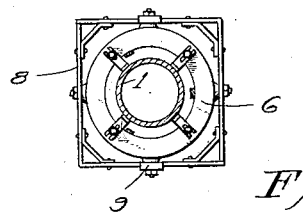
Figure 5:
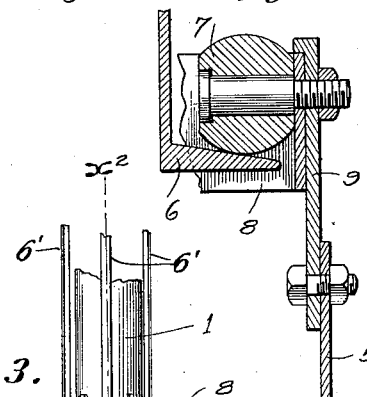
Figure 3:
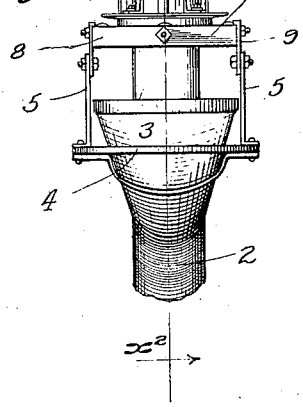
Figure 2:
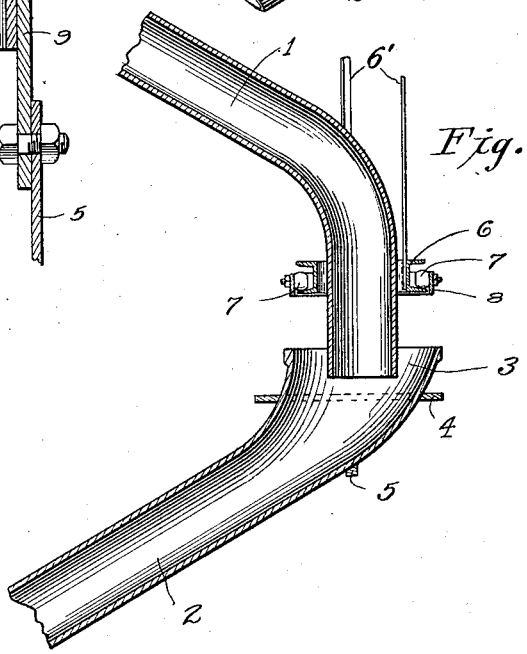

Referring to the drawings: Figure 1 is a side elevation. Fig. 2 is a vertical section on line $x^2$—$x^2$ Fig. 3. Fig. 3 is an end elevation of the joint. Fig. 4 is a section on line $x^4$—$x^4$ Fig. 1. Fig. 5 is a section on line $x^5$—$x^5$ of Fig. 1.

1 designates the upper member of the joint and 2 designates the lower member of the joint. The upper member 1 is curved and of substantially the same cross section throughout, while the lower member 2 is gradually flared at its upper end to form a pan-shaped end 3. For convenience, the member 2 may be referred to as the pan member. The pan member is supported by a plate 4, the latter being cut out to receive the pan member, the latter loosely resting in the plate 4 and being capable of moving uniformly therein but restricted from complete revolution when the lower part of strap 5 is not detached, the flaring shape of the pan preventing the end from falling through the plate 4. The plate 4 is suspended by a strap 5 which is continued around underneath the pan member 2 for further support to the pan member at a point against which the concrete strikes as it is delivered into the pan member from the upper member.

The upper member is provided with an annular grooved track 6, on which is supported, by rollers 7, a frame 8, the frame 8 being attached by trunnions 9 to the strap 5. The trunnions 9 permit a relative rocking movement between the strap 5 and the track 6, this rocking movement being in a vertical plane, while the track 6 and rollers 7 coöperate to permit rotative movement in a horizontal plane between the members 1 and roller frame 8 and strap 5. The weight of the upper member 1 and attachments is carried by the track and rollers and trunnions 9 which in turn are supported by the strap 5. Thus the strap 5 serves to support the upper member of the joint and the lower member of the joint, but both members of the joint have different points of support on the straps, so that the joint between the two is perfectly free and unrestricted, which affords the maximum flexibility and widest range of adjustment.

The concrete flows from the upper member 1 into the pan 3, thence down into the member 2 and on account of the annular space between the pan 3 and the adjoining end of the member 1, a very wide range of adjustment is afforded for the pan member 3, either swiveling in a horizontal plane or in a vertical plane. The member 2 is capable of complete rotation in a horizontal plane while it may be moved in a vertical plane through a range which is more than ample to meet the most extreme conditions in actual work. The lower part of the strap 5 below the plate 4 may be removed whenever it is desired to completely rotate the pan member joint without turning the upper swivel.

What I claim is:

1. A swivel pan joint comprising an upper joint member, a lower joint member having an enlarged end forming a pan member into which the upper member projects, there being an annular space formed between the upper member and the pan member, supporting means, a swivel bearing between the supporting means and the upper member, and a revoluble connection between the supporting means and the lower member.

2. In a swivel pan joint, an upper member and a lower member, supporting means, a swivel bearing between the upper member and the said supporting means, and a revoluble connection between the lower member and said supporting means.

3. In a swivel pan joint, an upper member and a lower member, supporting means, a swivel bearing between the upper member and the said supporting means, a revoluble connection between the lower member and said supporting means, and trunnions between the upper member and its swivel bearing.

4. A swivel pan joint comprising an upper member, a lower member having a pan-shaped end to receive the discharge from the upper member, a plate recessed to receive the pan member and support the same, supporting means for said plate, and a swivel bearing carried by said supporting means and carrying said upper member.

5. A swivel pan joint comprising an upper member, a lower member having a pan-shaped end to receive the discharge from the upper member, a plate recessed to receive the pan member and support the same, supporting means for said plate, and a swivel bearing carried by said supporting means and carrying said upper member, said upper member being pivotally connected to said swivel bearing and capable of swinging in a vertical plane.

6. A swivel pan joint comprising an upper member, a lower member, a strap, means on said strap flexibly supporting the lower member, a swivel bearing carried by said strap, said bearing supporting the upper member.

7. A swivel pan joint comprising an upper member, a lower member, a strap, means on said strap flexibly supporting the lower member, a swivel bearing carried by said strap, said bearing supporting the upper member, said strap extending under the pan member below the plate.

In testimony whereof, I have hereunto set my hand at Los Angeles, California, this 3rd day of February 1911.

THEODORE EMTMAN.

Witnesses:
G. T. Hackley,
Frank L. A. Graham.

---

Copies of this patent may be obtained for five cents each, by addressing the "Commissioner of Patents, Washington, D. C."